United States Patent
Iwamoto

(10) Patent No.: US 12,209,563 B2
(45) Date of Patent: Jan. 28, 2025

(54) CANISTER

(71) Applicant: FUTABA INDUSTRIAL CO., LTD., Okazaki (JP)

(72) Inventor: Koji Iwamoto, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 198 days.

(21) Appl. No.: 17/979,382

(22) Filed: Nov. 2, 2022

(65) Prior Publication Data

US 2023/0151783 A1 May 18, 2023

(30) Foreign Application Priority Data

Nov. 15, 2021 (JP) ................. 2021-185792

(51) Int. Cl.
  *F02M 25/00* (2006.01)
  *B01D 53/04* (2006.01)
  *F02M 25/08* (2006.01)

(52) U.S. Cl.
  CPC ..... *F02M 25/0854* (2013.01); *B01D 53/0407* (2013.01); *B01D 2259/4516* (2013.01)

(58) Field of Classification Search
  CPC ............. F02M 25/0854; F02M 25/089; B01D 53/0407; B01D 53/0415; B01D 2259/4516; B01D 2253/102; B01D 2257/702; B60K 15/03504; B60K 2015/03514
  See application file for complete search history.

(56) References Cited

U.S. PATENT DOCUMENTS

| 4,750,923 | A | 6/1988 | Haruta et al. | |
|---|---|---|---|---|
| 8,545,610 | B2* | 10/2013 | Makino | B01D 53/0438 96/135 |
| 10,221,812 | B2* | 3/2019 | Iwamoto | F02M 25/0854 |
| 11,905,915 | B2* | 2/2024 | Iwamoto | F02M 25/0872 |
| 2002/0124732 | A1* | 9/2002 | Hara | B01D 53/0446 96/132 |

(Continued)

FOREIGN PATENT DOCUMENTS

| JP | H05202818 A | 8/1993 |
|---|---|---|
| JP | 2009156030 A | 7/2009 |

(Continued)

OTHER PUBLICATIONS

Non-Final Office Action for U.S. Appl. No. 17/977,436, mailed Aug. 31, 2023, 7 pages.

(Continued)

*Primary Examiner* — Phutthiwat Wongwian
*Assistant Examiner* — Sherman D Manley
(74) *Attorney, Agent, or Firm* — Withrow + Terranova, PLLC; Vincent K. Gustafson

(57) ABSTRACT

Provided is a canister including at least one chamber, an inflow port, an atmosphere port, an outflow port, and a plurality of rod-shaped portions. In the at least one chamber, an adsorbent for fuel vapor is arranged. The plurality of rod-shaped portions is a plurality of elongated portions arranged in an object chamber, which is any of the at least one chamber. The adsorbent arranged in the object chamber is formed as a plurality of granular bodies. At least a part of the plurality of rod-shaped portions has, on an outer peripheral surface thereof, at least one recess formed.

14 Claims, 8 Drawing Sheets

(56) References Cited

U.S. PATENT DOCUMENTS

| | | | |
|---|---|---|---|
| 2017/0167447 A1 | 6/2017 | Omichi et al. | |
| 2018/0163671 A1* | 6/2018 | Iwamoto | B01D 53/0446 |
| 2018/0283322 A1* | 10/2018 | Kuboyama | F02M 25/089 |
| 2019/0186426 A1* | 6/2019 | Nakagawa | B67D 7/0476 |
| 2020/0124004 A1* | 4/2020 | Ajiki | F02M 25/0854 |
| 2021/0199071 A1* | 7/2021 | Ajiki | B01D 53/0446 |
| 2021/0285407 A1 | 9/2021 | Murata | |
| 2022/0333558 A1 | 10/2022 | Iwamoto | |
| 2022/0333559 A1 | 10/2022 | Iwamoto | |

FOREIGN PATENT DOCUMENTS

| | | |
|---|---|---|
| JP | 2009191688 A | 8/2009 |
| JP | 2018096254 A | 6/2018 |
| JP | 2019108880 B2 | 7/2019 |
| JP | 2020067014 A | 4/2020 |
| JP | 2020112164 A | 7/2020 |
| JP | 2021107704 A | 7/2021 |

OTHER PUBLICATIONS

Notice of Reasons for Refusal for Japanese Patent Application No. 2021185792, mailed Sep. 26, 2023, 8 pages.
Notice of Reasons for Refusal for Japanese Patent Application No. 2021185793, mailed Oct. 17, 2023, 8 pages.

* cited by examiner

CANISTER

CROSS-REFERENCE TO RELATED APPLICATIONS

This application claims the benefit of Japanese Patent Application No. 2021-185792 filed on Nov. 15, 2021 with the Japan Patent Office, the entire disclosure of which is incorporated herein by reference.

BACKGROUND

The present disclosure relates to a canister for adsorbing fuel vapor generated in a fuel tank.

As disclosed in Japanese Unexamined Patent Application Publication No. 2018-96254, known is a technique of providing, in a chamber of a canister, a plurality of rod-shaped portions extending substantially parallel to a flow direction of fuel vapor in order to reduce the ventilation resistance.

SUMMARY

In recent years, however, there has been a tendency to decrease engine displacement of a vehicle for better fuel efficiency, and this leads to decrease in purge air for removing the fuel accumulated in the canister. In order to satisfactorily remove the fuel accumulated in the canister with less purge air, the ventilation resistance of the canister needs to be reduced.

Moreover, in recent years, performance level required of the canister has been further raised for environmental measures, and in general, the performance of the canister is improved with the improvement in L/D. L means the length of the chamber of the canister in a gas flow direction, and D means an equivalent diameter of a cross section of the chamber perpendicular to the gas flow direction. However, the improvement in L/D causes increase in the ventilation resistance of the canister, resulting in greater pressure loss in the canister.

In one aspect of the present disclosure, it is desirable to reduce the ventilation resistance of a canister.

One aspect of the present disclosure is a canister configured to be mounted in a vehicle with an engine. The canister comprises at least one chamber, an inflow port, an atmosphere port, an outflow port, and a plurality of rod-shaped portions. In the at least one chamber, an adsorbent to adsorb fuel vapor is arranged. The inflow port is configured to allow the fuel vapor to flow into the at least one chamber from a fuel tank of the vehicle. The atmosphere port is configured to allow atmospheric air to flow into the at least one chamber from outside of the vehicle. The outflow port is configured to allow the fuel vapor adsorbed on the adsorbent to flow out toward the engine by means of the atmospheric air flowing in from the atmosphere port. The plurality of rod-shaped portions is a plurality of elongated portions arranged in an object chamber, which is any of the at least one chamber. The adsorbent arranged in the object chamber is formed as a plurality of granular bodies. At least a part of the plurality of rod-shaped portions has, on an outer peripheral surface thereof, at least one recess formed.

In the above-described configuration, gaps are formed, in the object chamber, between the at least one recess formed on the rod-shaped portion and the adsorbent as the plurality of granular bodies. This enables reduction of the ventilation resistance of the canister.

In one aspect of the present disclosure, the plurality of rod-shaped portions may extend substantially parallel to a gas flow direction in the object chamber.

This configuration encourages the gaps between the at least one recess on the rod-shaped portion and the adsorbent to be formed along the gas flow direction, in the object chamber. Accordingly, the ventilation resistance of the canister can be further reduced.

In one aspect of the present disclosure, the at least one recess may be a groove-shaped portion extending substantially parallel to an extending direction of each rod-shaped portion of the plurality of rod-shaped portions on which the at least one recess is arranged.

This configuration encourages the gaps between the at least one recess on the rod-shaped portion and the adsorbent to be formed along the extending direction of the rod-shaped portion, in the object chamber. Accordingly, the ventilation resistance of the canister can be further reduced.

In one aspect of the present disclosure, each granular body of the plurality of granular bodies as the adsorbent arranged in the object chamber may be substantially cylindrically shaped. A width of the at least one recess may be smaller than a diameter of a cross section of each granular body of the plurality of granular bodies perpendicular to an extending direction thereof.

This configuration makes it possible to inhibit the granular bodies as the adsorbent from entering the inside of the at least one recess formed on the rod-shaped portion to thereby facilitate formation of the gaps between the at least one recess on the rod-shaped portion and the adsorbent. Accordingly, the ventilation resistance of the canister can be further reduced.

In one aspect of the present disclosure, the canister may further comprise a coupler to couple each rod-shaped portion of the plurality of rod-shaped portions to another rod-shaped portion of the plurality of rod-shaped portions. The coupler may be arranged at an end of each rod-shaped portion of the plurality of rod-shaped portions.

This configuration facilitates manufacture of the rod-shaped portions and the couplers, and also enables reduction of workload in arranging the adsorbent in the object chamber.

In one aspect of the present disclosure, the canister may further comprise a coupler to couple each rod-shaped portion of the plurality of rod-shaped portions to another rod-shaped portion of the plurality of rod-shaped portions. The coupler may be arranged at a position apart from ends of each rod-shaped portion of the plurality of rod-shaped portions.

This configuration makes it possible to avoid the couplers from being arranged at ends of the object chamber, to thereby inhibit occurrence of non-uniform flow of the atmospheric air and the fuel vapor at the ends of the object chamber. Accordingly, it is possible to encourage the flow of the atmospheric air and the fuel vapor to be more uniform, in the object chamber as a whole.

In one aspect of the present disclosure, the plurality of rod-shaped portions may comprise at least one particular rod-shaped portion. The at least one particular rod-shaped portion may have the at least one recess arranged thereon, and may comprise at least two segments arranged along an extending direction of the at least one particular rod-shaped portion. The at least two segments adjacent to each other may differ in a shape of a cross section thereof perpendicular to the extending direction of the at least one particular rod-shaped portion.

This configuration makes it possible to adjust the ventilation resistance of the object chamber more flexibly.

In one aspect of the present disclosure, the plurality of rod-shaped portions may comprise rod-shaped portions of at least two types. The rod-shaped portions of at least two types may differ in a shape of a cross section thereof perpendicular to an extending direction of each rod-shaped portion.

This configuration makes it possible to adjust the ventilation resistance of the object chamber more flexibly.

In one aspect of the present disclosure, at least a part of the plurality of rod-shaped portions may have, on an outer peripheral surface thereof, a plurality of recesses formed. In one aspect of the present disclosure, the at least one recess may be formed on each rod-shaped portion of the plurality of rod-shaped portions.

These configurations make it possible to adjust the ventilation resistance of the object chamber more flexibly.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
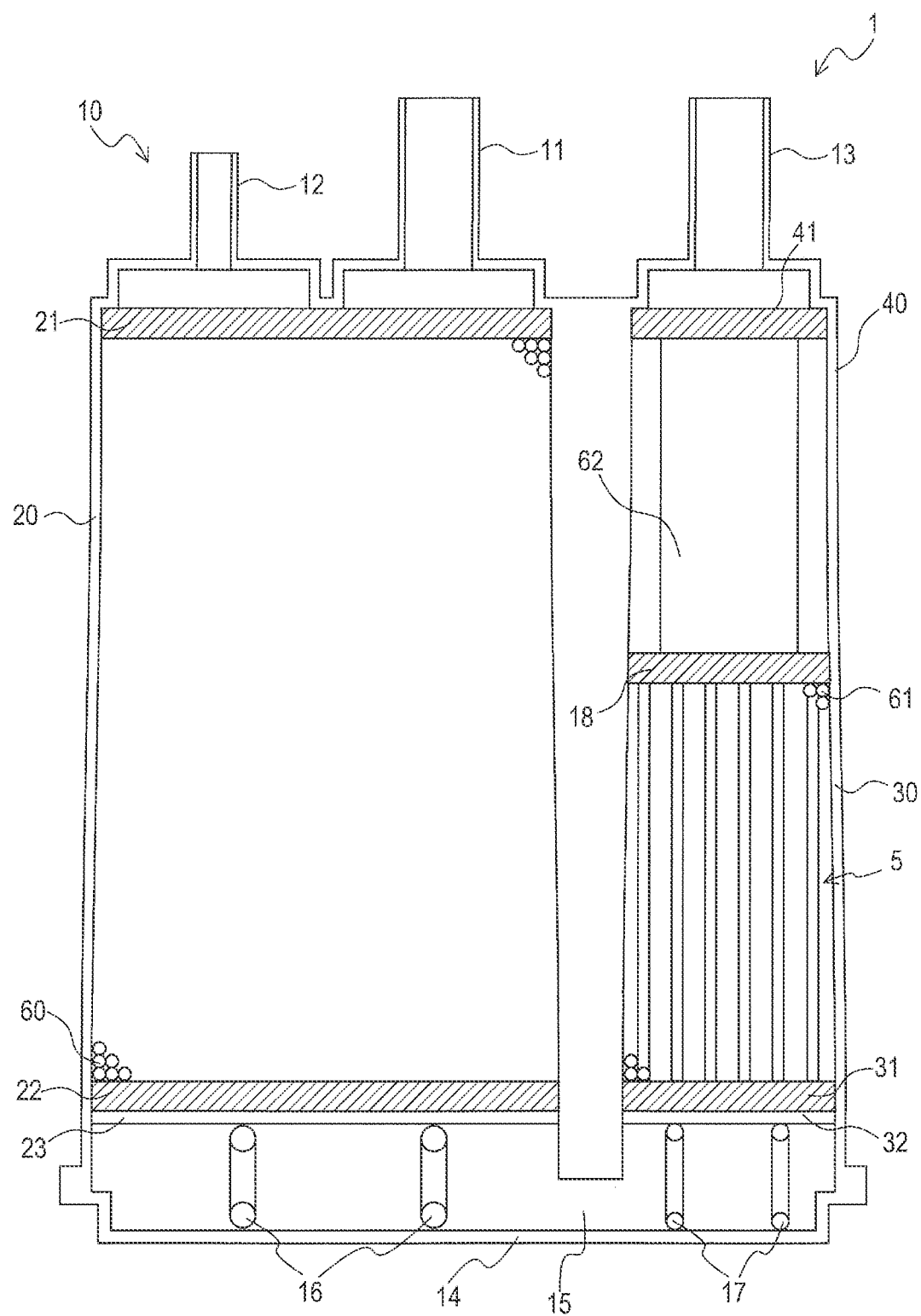
FIG. 1 is a sectional view of a canister of a first embodiment as viewed from its side.

Embodiments of the present disclosure are not limited to the embodiments below, and may take various forms as long as they belong to the technical scope of the present disclosure.

First Embodiment

1. Configuration of Canister

A canister 1 of a first embodiment (see FIG. 1) is mounted in a vehicle. The vehicle in which the canister 1 is mounted will be hereinafter referred to as the vehicle concerned. The canister 1 comprises a container 10 of synthetic resin. The container 10 comprises a first chamber 20, a second chamber 30, and a third chamber 40. Arranged respectively in the first chamber 20, the second chamber 30, and the third chamber 40 are adsorbents 60, 61, and 62 for adsorbing fuel vapor. The number of chambers in the canister 1 may be, for example, two or less, or four or more.

The adsorbent 60 in the first chamber 20 may be formed as, for example, powdered activated carbon, or may be formed as pellets to be described below.

Figure 2:
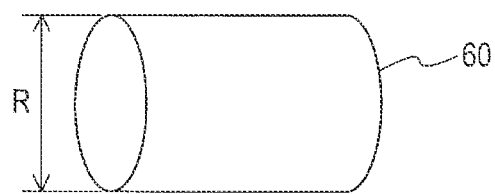
FIG. 2 is an explanatory diagram of an adsorbent of the first embodiment, formed as a pellet of activated carbon.

The adsorbent 61 in the second chamber 30 is formed as pellets, which are granular activated carbon (see FIG. 2). As an example, each pellet has a substantially cylindrical shape, and the diameter of a cross section of the pellet perpendicular to its extending direction (i.e., its axial direction) is hereinafter referred to as R. However, the shape of the pellet is not limited to a cylindrical shape, and may be a spheroidal shape, for example. In the case where the pellet has a spheroidal shape, the diameter of the pellet may be set to R. Alternatively, the adsorbent 61 may be formed as a granular adsorbent other than the pellets.

As an example, the adsorbent 62 in the third chamber 40 is formed as a honeycomb carbon block with a ventilation resistance lower than those of the powdered activated carbon and the pellets. The honeycomb carbon block comprises a side wall having a cylindrical shape, and is arranged in the third chamber 40 so as to extend in a gas flow direction. Provided inside the side wall are a plurality of flow paths passing through the honeycomb carbon block in its extending direction.

The adsorbent 62 in the third chamber 40 may be formed of the powdered activated carbon, or may be formed of the pellets. Alternatively, the adsorbents 60, 61, and 62 respectively arranged in the first chamber 20, the second chamber 30, and the third chamber 40 may be formed of a material other than the activated carbon.

Provided at an end of the container 10 are an inflow port 11, an outflow port 12, and an atmosphere port 13. The inflow port 11 and the outflow port 12 allow for communication between the inside of the first chamber 20 and the outside of the container 10. The atmosphere port 13 allows for communication between the inside of the third chamber 40 and the outside of the container 10.

Hereinafter, a side of the container 10 of the canister 1 where the inflow port 11, the outflow port 12, and the atmosphere port 13 are arranged is referred to as a port side. The container 10 includes an opening on a side opposite to the port side. The opening is closed by a lid member 14. Hereinafter, the side opposite to the port side (i.e., a side where the lid member 14 is arranged) is referred to as a lid side.

The inflow port 11 is connected to a fuel tank for an engine of the vehicle concerned. The fuel vapor generated in the fuel tank flows into the canister 1 via the inflow port 11, and is adsorbed on the adsorbents 60, 61, and 62 in the respective chambers. In this way, the fuel is accumulated inside the canister 1.

The outflow port 12 is connected to an intake pipe of the engine of the vehicle concerned, and the atmosphere port 13 communicates with the outside of the vehicle concerned. The negative intake air pressure of the engine causes atmospheric air (i.e., purge air) to flow into the canister 1 via the atmosphere port 13. Such inflow of the purge air causes the fuel adsorbed on the adsorbents 60, 61, and 62 to be desorbed, and the desorbed fuel flows out together with purge air from the outflow port 12 toward the intake pipe. In this way, a purging to remove the fuel adsorbed on the adsorbents 60, 61, and 62 is carried out, and the adsorbents 60, 61, and 62 are recovered.

In other words, the fuel vapor flowing in from the inflow port 11, the fuel vapor flowing out from the outflow port 12 during the purging, and the purge air flowing in from the atmosphere port 13 during the purging, flow in the chambers 20, 30, and 40 along a direction in which an end on the port side and an end on the lid side face each other.

As an example, the first chamber 20 has a substantially rectangular parallelepiped shape, and its port side end is connected to the inflow port 11 and to the outflow port 12. There are provided filters 21 and 22, respectively, on the port side end and a lid side end of the first chamber 20, and the adsorbent 60 is arranged between the filters 21 and 22.

The first chamber 20 communicates, on its lid side end, with a communicating passage 15. The communicating passage 15 is arranged along the lid member 14, thus interconnecting the first chamber 20 and the second chamber 30. There is provided a porous plate 23 with permeability between the filter 22 on the lid side of the first chamber 20 and the communicating passage 15, and a coil spring 16 is provided between the porous plate 23 and the lid member 14. The coil spring 16 presses the porous plate 23 toward the port side. This allows fluid to flow to and fro between the first chamber 20 and the second chamber 30 via the communicating passage 15, in the inside of the canister 1.

The second chamber 30 and the third chamber 40 are adjacent to the first chamber 20, and each have an elongated shape extending from the lid side to the port side. The second chamber 30 and the third chamber 40 are arranged from the lid side to the port side, with their ends adjacent to each other. The second chamber 30 and the third chamber 40 are separated by a partition member 18 with permeability having a plate shape. This allows fluid to pass through the partition member 18 and flow to and fro between the inner space of the second chamber 30 and the inner space of the third chamber 40.

There is provided a filter 31 on a lid side end of the second chamber 30, and the adsorbent 61 is arranged between the filter 31 and the partition member 18. Further, there is provided a filter 41 on a port side end of the third chamber 40, and the adsorbent 62 is arranged between the filter 41 and the partition member 18.

There is provided a porous plate 32 with permeability between the filter 31 on the lid side of the second chamber 30 and the communicating passage 15, and a coil spring 17 is provided between the porous plate 32 and the lid member 14. The coil spring 17 presses the porous plate 32 toward the port side. The port side end of the third chamber 40 is connected to the atmosphere port 13.

2. Grid Member

In the first embodiment, as an example, the second chamber 30 is configured as an object chamber, and a grid member 5 is provided in the second chamber 30 (see FIG. 1). As an example, the grid member 5 is formed of a resin into one piece, and comprises a plurality of rod-shaped portions 50, first and second couplers 52 and 53, and first and second spacers 54 and 55 (see FIGS. 3 through 5). The grid member 5 may be formed of a material other than the resin.

The rod-shaped portions 50 are elongated portions extending so as to be substantially parallel to each other with spaces therebetween, and are arranged so as to form, as an example, a first row 5C, a second row 5D, and a third row 5E. The rod-shaped portions 50 have the lengths substantially identical to each other, and are arranged throughout the second chamber 30 so as to extend substantially parallel to the gas flow direction. A first end 5A of each rod-shaped portion 50 is located on or around a port side end of the second chamber 30, and a second end 5B is located on or around the lid side end of the second chamber 30.

The number of the rows of the rod-shaped portions 50 and the number of the rod-shaped portions 50 arranged in each row may be determined as appropriate according to the size of the chamber in which the grid member 5 is arranged. Alternatively, a configuration may be employed in which the first end 5A of each rod-shaped portion 50 is located on the lid side end of the second chamber 30 and the second end 5B is located on the port side end.

The outer peripheral surface of each rod-shaped portion 50 may extend parallel to its extending direction so that its thickness (i.e., the area of its cross section) is constant, or the outer peripheral surface may be inclined with respect to the extending direction. More specifically, the outer peripheral surface of each rod-shaped portion 50 may be inclined with respect to its extending direction so that it becomes thinner with increasing distance from the first coupler 52 or from the second coupler 53 toward the corresponding end.

The first and second couplers 52 and 53 are each arranged substantially in the middle in the extending direction of the corresponding rod-shaped portion 50, and each couple the corresponding rod-shaped portion 50 to at least one of the other rod-shaped portions 50. As an example, the first and second couplers 52 and 53 each couple the corresponding rod-shaped portions 50 in the first row 5C or the third row 5E to the nearest rod-shaped portion 50 in the second row 5D. Also, the first and second couplers 52 and 53 each couple the corresponding rod-shaped portion 50 in the second row 5D to another one or other two of the rod-shaped portions 50 in the second row 5D, adjacent to such corresponding rod-shaped portion 50.

The first coupler 52 is positioned on a side of the first end 5A with respect to the center of the rod-shaped portion 50 in its extending direction, and the second coupler 53 is positioned on a side of the second end 5B with respect to such center. The positions of the first and second couplers 52 and 53 are not limited to the ones described above, and are determined as appropriate. However, it is preferred that the first and second couplers 52 and 53 be arranged at positions apart from the ends of the rod-shaped portions 50 (i.e., from the ends of the second chamber 30).

The first spacer 54 is a portion for spacing the rod-shaped portions 50 from the inner wall of the second chamber 30, and is arranged substantially in the middle in the extending direction of the rod-shaped portion 50 located on each end of the first and third rows 5C and 5E. The first spacer 54 protrudes toward the inner wall of the second chamber 30 from the outer peripheral surface of such rod-shaped portion 50, and abuts the inner wall of the second chamber 30.

The second spacer 55 is a portion for spacing the rod-shaped portions 50 from the inner wall of the second chamber 30, and is arranged on the first ends 5A of the two rod-shaped portions 50 located in the middle of each of the first and third rows 5C and 5E. The second spacer 55 comprises a first part abutting the inner wall of the second chamber 30, and also comprises a second part connecting the first part to the respective outer peripheral surfaces of such two rod-shaped portions 50.

The first chamber 20 or the third chamber 40 may be configured as the object chamber in which the grid member 5 is arranged, or two or more of the first chamber 20, the second chamber 30, and the third chamber 40 may be configured as the object chambers. In the object chamber, a granular adsorbent, such as pellets, is arranged.

3. Details of Rod-Shaped Portion

Figure 3:
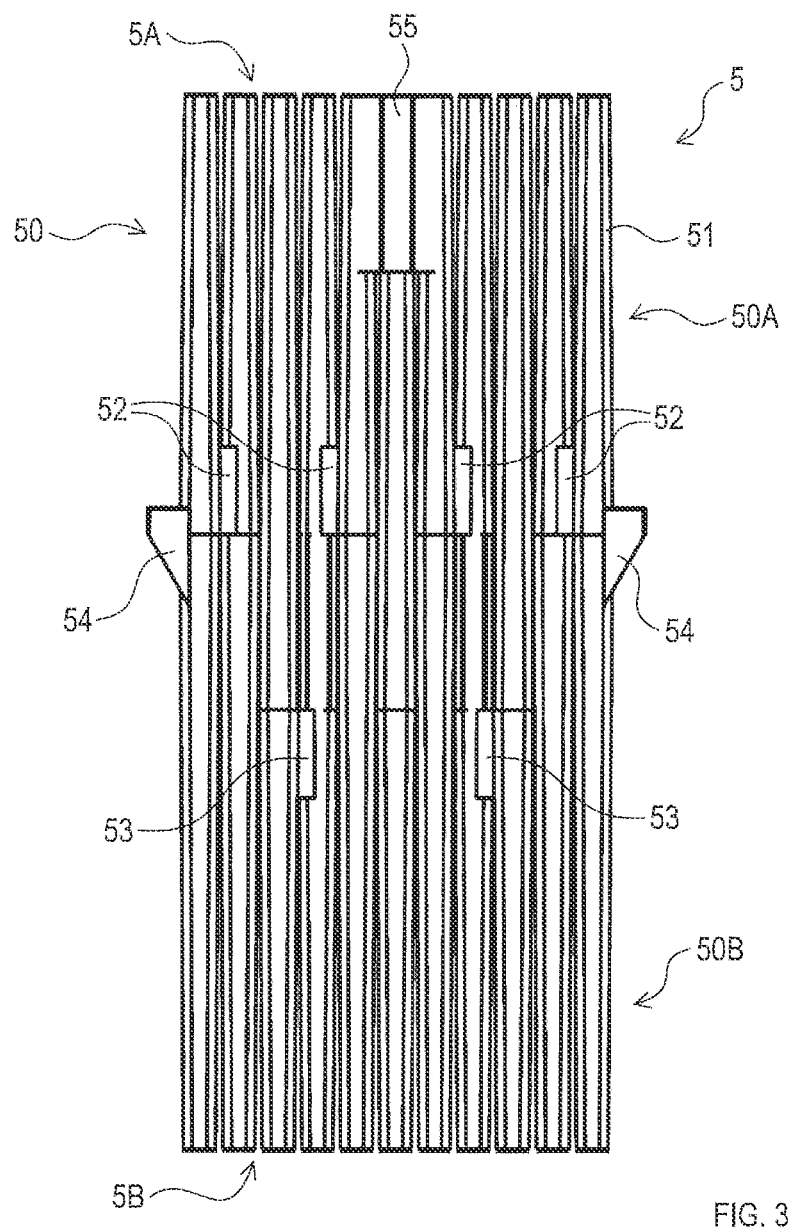
FIG. 3 is a front view of a grid member of the first embodiment.
Figure 4:
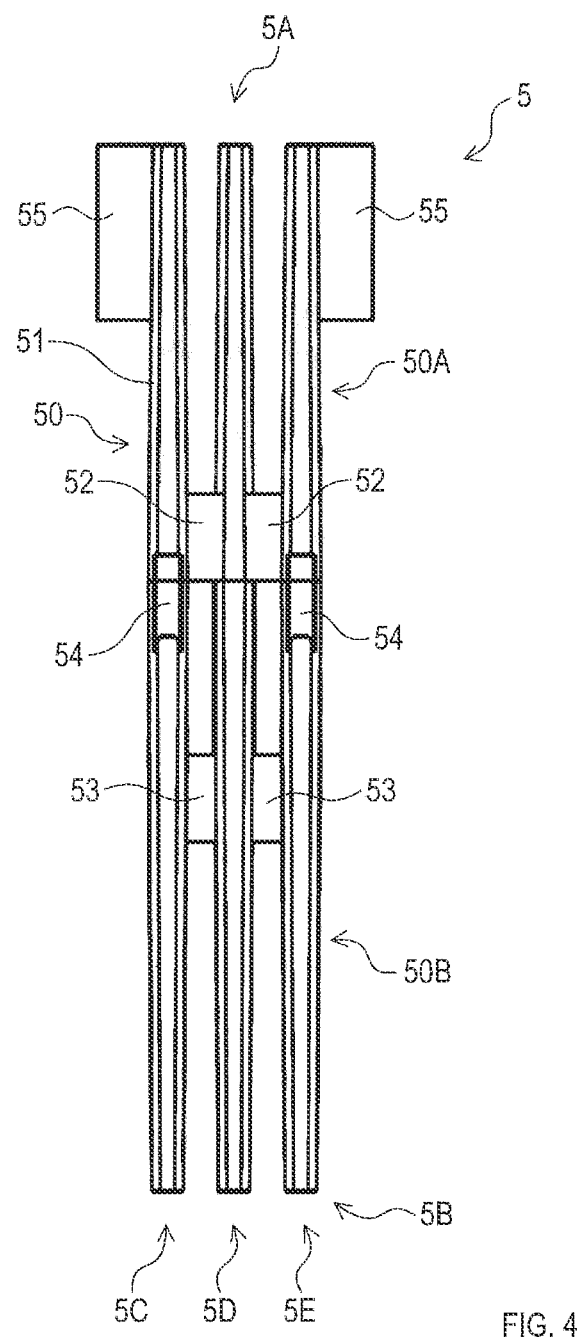
FIG. 4 is a side view of the grid member of the first embodiment.
Figure 5:
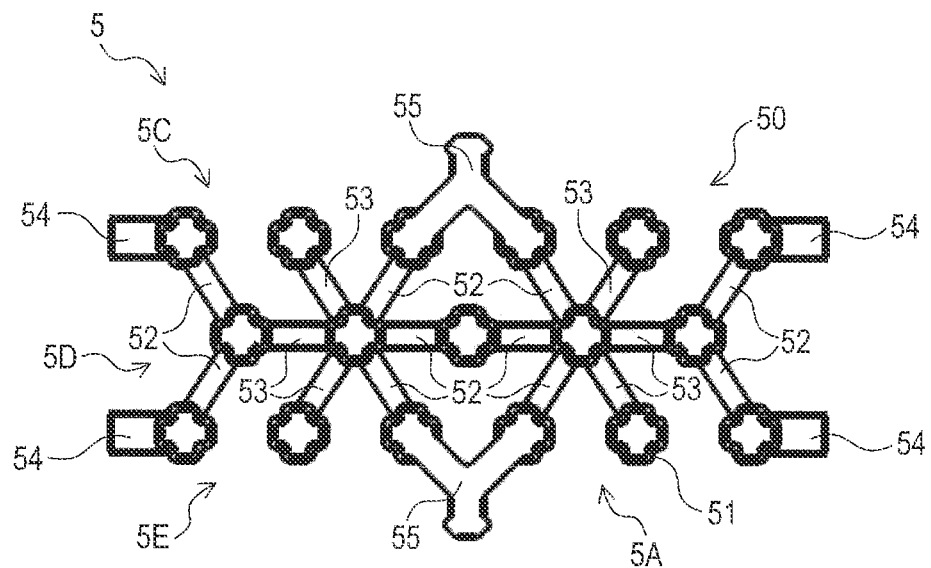
FIG. 5 is a bottom view of the grid member of the first embodiment as viewed from a first end side.

Each rod-shaped portion 50 in the grid member 5 has at least one recess 51 formed on its outer peripheral surface (see FIGS. 3 through 5). As an example, the at least one recess 51 is a groove-shaped portion extending substantially parallel to the extending direction of the rod-shaped portion 50 from the first end 5A or its vicinity to the second end 5B or its vicinity. For the grid member 5, the rod-shaped portions 50 having various shapes may be used.

Figure 6:
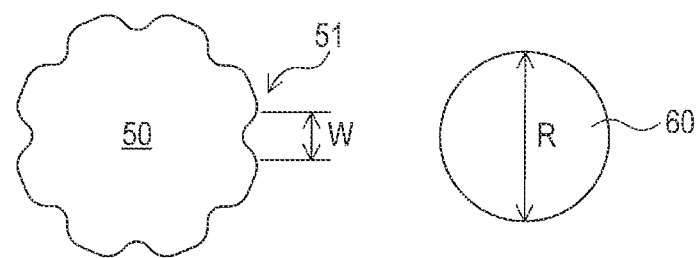
FIG. 6 is a sectional view of a rod-shaped portion of the first embodiment, perpendicular to its extending direction.

Specifically, for example, each rod-shaped portion 50 may be formed such that its cross section perpendicular to its extending direction (hereinafter simply referred to as the cross section) is substantially circular, and also a plurality of the recesses 51 may be formed on the outer peripheral surface of the rod-shaped portion 50 so as to be arranged with substantially equal spacing along the periphery of the cross section (see FIG. 6).

Figure 7:
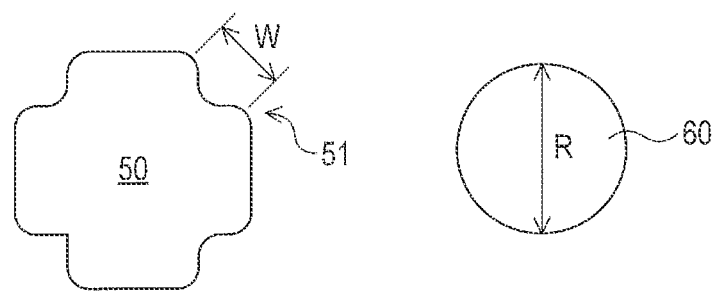
FIG. 7 is a sectional view of a rod-shaped portion of the first embodiment, perpendicular to its extending direction.

Alternatively, for example, each rod-shaped portion 50 may be formed such that its cross section is substantially square, and also the recesses 51 may be formed in respective positions, on the outer peripheral surface of the rod-shaped portion 50, corresponding to four corners of the cross section (see FIG. 7).

Figure 8:
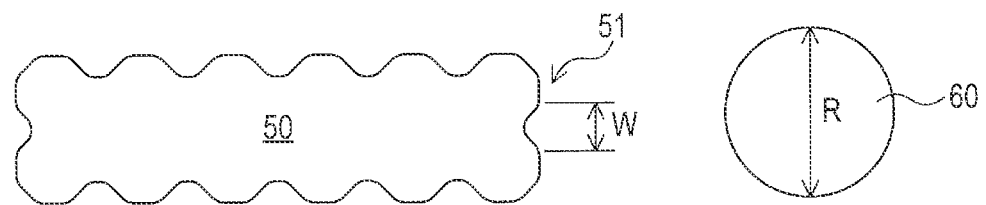
FIG. 8 is a sectional view of a rod-shaped portion of the first embodiment, perpendicular to its extending direction.

Alternatively, for example, each rod-shaped portion 50 may be formed such that its cross section is substantially rectangular, and also the recesses 51 may be formed on the outer peripheral surface of the rod-shaped portion 50 so as to be arranged with substantially equal spacing along the periphery of the cross section (see FIG. 8).

Figure 9:
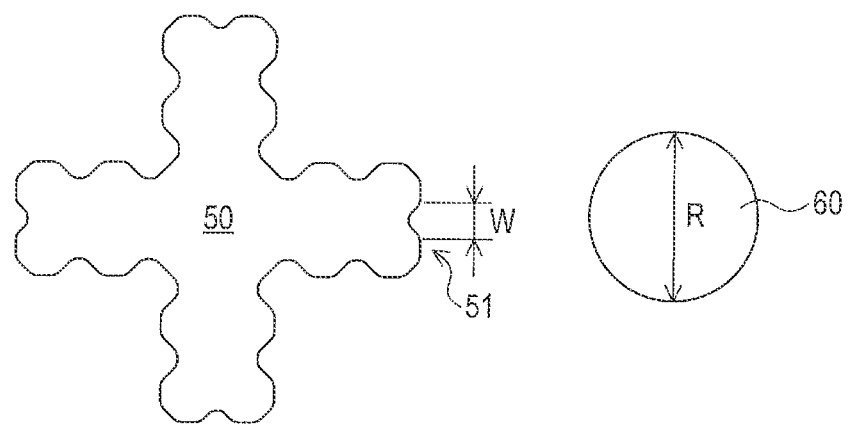
FIG. 9 is a sectional view of a rod-shaped portion of the first embodiment, perpendicular to its extending direction.

Alternatively, for example, each rod-shaped portion 50 may be formed such that its cross section is X-shaped, and also the recesses 51 may be formed on the outer peripheral surface of the rod-shaped portion 50 so as to be arranged with substantially equal spacing along the periphery of the cross section (see FIG. 9).

Figure 10:
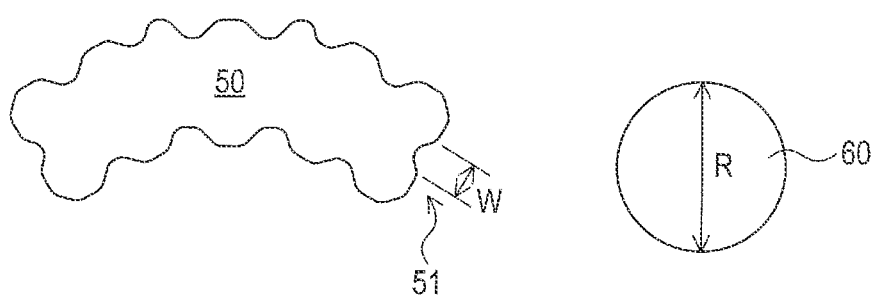
FIG. 10 is a sectional view of a rod-shaped portion of the first embodiment, perpendicular to its extending direction.

Alternatively, for example, each rod-shaped portion 50 may be formed such that its cross section has a curved rectangular shape, and also the recesses 51 may be formed on the outer peripheral surface of the rod-shaped portion 50 so as to be arranged with substantially equal spacing along the periphery of the cross section (see FIG. 10).

The width W of the recess 51 is smaller than the diameter R of the cross section of the adsorbent 61 formed as cylindrically-shaped pellets. Obviously, the width W of the recess 51 can be determined as appropriate without being limited to the above, and may be greater than or equal to the diameter R of the cross section of the adsorbent 61. The recesses 51 formed in each rod-shaped portion 50 may be one in number.

4. Modified Example of Rod-Shaped Portion

Besides, for example, the grid member 5 may be configured with the rod-shaped portions 50 of two or more types differing in the shape of the cross section (i.e., differing in the number, position, size, and/or shape of the recesses 51). Specifically, for example, a configuration may be employed in which first to third rod-shaped portions of different types are provided and the first to third rod-shaped portions are respectively arranged in the first to third rows 5C to 5E (see FIGS. 4 and 5).

Figure 11:
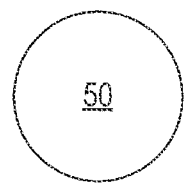
FIG. 11 is a sectional view of a rod-shaped portion of the first embodiment, perpendicular to its extending direction.

The at least one recess 51 may be formed on all of the first to third rod-shaped portions, or no recess 51 may be formed on one or two of the first to third rod-shaped portions. The cross section of the rod-shaped portion 50 on which the recess 51 is not formed may be circular, as an example (see FIG. 11). The first to third rod-shaped portions may each have any of the cross sections illustrated in FIGS. 6 through 10. The rod-shaped portions of two or more types differing in the shape of the cross section may be arranged in the same row.

At least a part of the rod-shaped portions 50 may be configured as a particular rod-shaped portion. The particular rod-shaped portion comprises two or more segments arranged along the extending direction of the particular rod-shaped portion. The segments adjacent to each other differ in the shape of the cross section. The shapes of the cross sections of the respective segments of the particular rod-shaped portion may be different from each other. Specifically, for example, the particular rod-shaped portion may be configured such that it has a boundary at a portion where the first coupler 52 or the second coupler 53 is arranged, and such that a first segment 50A is arranged on a side of the first end 5A and a second segment 50B is arranged on a side of the second end 5B, with respect to the boundary (see FIGS. 3 and 4). Obviously, the particular rod-shaped portion may be configured such that the boundary is arranged at a position different from where the first coupler 52 or the second coupler 53 is arranged.

The at least one recess 51 may be formed on both of the first and second segments 50A and 50B, or no recess 51 may be formed on one of the first and second segments 50A and 50B. Further, the first and second segments 50A and 50B on which the at least one recess 51 is formed may each have any of the cross sections illustrated in FIGS. 6 through 10.

Alternatively, the grid member 5 may be configured with at least one particular rod-shaped portion and with the at least one rod-shaped portion 50 whose cross sectional shape is substantially identical from the first end 5A through the second end 5B (hereinafter referred to as a regular rod-shaped portion). In this case, the grid member 5 may comprise the particular rod-shaped portions of two or more types differing in the shape of the cross section in at least one segment, or may comprise the regular rod-shaped portions of two or more types differing in the shape of the cross section.

As described above, the case is assumed in which the outer peripheral surface of each rod-shaped portion 50 is inclined with respect to the extending direction and the thickness of each rod-shaped portion 50 is not constant. In this case, the respective cross sections of the rod-shaped portion 50 in its different positions in the extending direction are substantially identical in the shape but different in the size (i.e., the respective cross sections are similar to each other). It is to be appreciated that such cross sections do not correspond to the above-described cross sections "differing in the shape".

Second Embodiment

5. Grid Member

Next, the canister 1 of a second embodiment will be described. The canister 1 of the second embodiment is different from that of the first embodiment in terms of the configuration of a grid member 7. The canister 1 of the second embodiment will be described below focusing on differences from that of the first embodiment.

Figure 12:
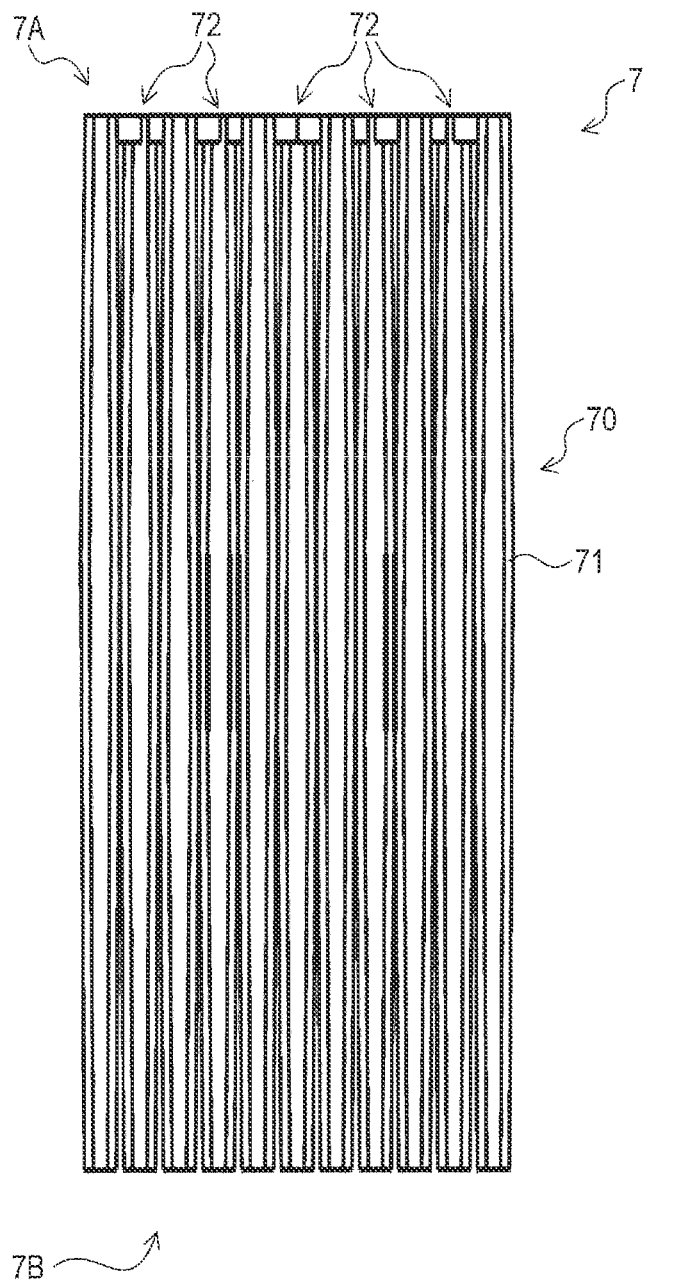
FIG. 12 is a front view of a grid member of a second embodiment.
Figure 13:
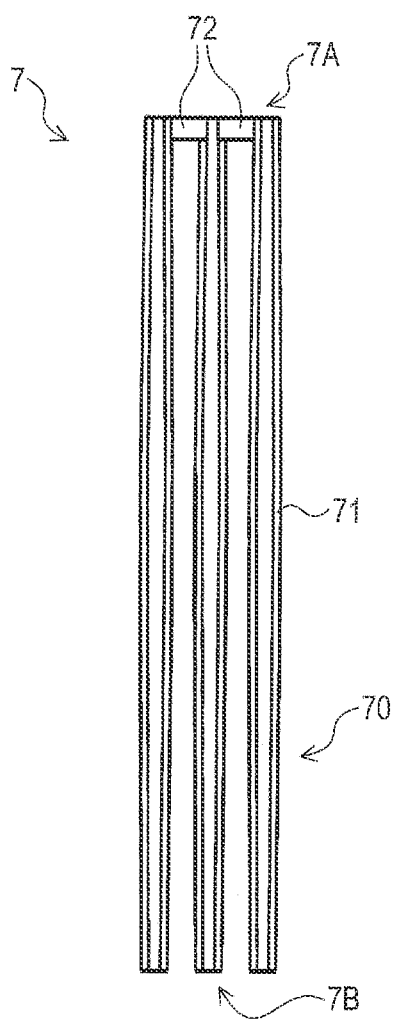
FIG. 13 is a side view of the grid member of the second embodiment.
Figure 14:
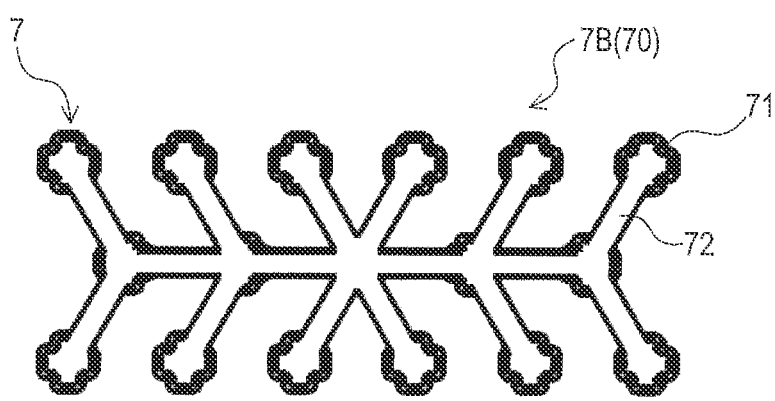
FIG. 14 is a bottom view of the grid member of the second embodiment as viewed from a first end side.

Similarly to the first embodiment, the grid member 7 is formed of a resin into one piece, as an example, and comprises a plurality of rod-shaped portions 70 and a coupler 72 (see FIGS. 12 through 14). The grid member 7 may be formed of a material other than the resin.

The plurality of rod-shaped portions 70 has a configuration as in the first embodiment, and is arranged in a chamber of the canister 1 in a manner similar to the first embodiment. The rod-shaped portions 70 are each provided with at least one recess 71 in a manner similar to the first embodiment, and the shape of the cross section of each rod-shaped portion 70 may be determined similarly to the first embodiment.

On the other hand, the grid member 7 of the second embodiment differs in terms of a configuration of the coupler 72 from the corresponding one in the first embodiment. Specifically, the coupler 72 is arranged on a first end 7A of each rod-shaped portion 70, and couples the rod-shaped portion 70 to at least one of the other rod-shaped portions 70. The coupler 72 may be arranged on a second end 7B of each rod-shaped portion 70.

In the grid member 7 of the second embodiment too, a spacer (not shown) for spacing the rod-shaped portions 70 from the inner wall of the second chamber 30 may be provided in a manner similar to the first embodiment.

6. Effects (1) In the above-described embodiments, gaps are formed, in the second chamber 30 as the object chamber, between the recesses formed on the rod-shaped portions and the adsorbent 61 as the pellets. This enables reduction of the ventilation resistance of the canister 1. Accordingly, L/D of the canister 1 can be increased while inhibiting increase in the pressure loss.

In the above-described embodiments, to reduce the ventilation resistance, the honeycomb carbon block, as an example, is used as the adsorbent 62 for the third chamber 40. However, the honeycomb carbon block requires higher cost than the powdered activated carbon, the pellets, or the like. To cope with this, the grid member 5 or 7 is arranged in the second chamber 30 to reduce the ventilation resistance of the second chamber 30, and this enables downsizing of the honeycomb carbon block, thus reducing the cost for the canister 1.

(2) The rod-shaped portions 50 and 70 extend substantially parallel to the gas flow direction in the second chamber 30. This encourages the gaps between the recesses on the rod-shaped portions and the adsorbent 61 to be formed along the gas flow direction, in the second chamber 30. Accordingly, the ventilation resistance of the canister 1 can be further reduced.

(3) The recesses 51 and 71 are groove-shaped portions extending substantially parallel to the extending direction of the rod-shaped portions 50 and 70, respectively. This encourages the gaps between the recesses 51 and the adsorbent 61, and between the recesses 71 and the adsorbent 61, to be formed along the extending direction of the rod-shaped portions 50 and 70, respectively, in the second chamber 30. Accordingly, the ventilation resistance of the canister 1 can be further reduced.

(4) The width W of the recesses 51 and 71 is smaller than the diameter R of the cross section of each pellet as the adsorbent 61. This makes it possible to inhibit the pellets from entering the inside of the recesses 51 and 71 to thereby facilitate formation of the gaps between the recesses and the pellets. Accordingly, the ventilation resistance of the canister 1 can be further reduced.

(5) The first and second couplers 52 and 53 in the first embodiment are each arranged substantially in the middle of the rod-shaped portions 50. This makes it possible to inhibit occurrence of non-uniform flow of the atmospheric air and the fuel vapor at the ends of the second chamber 30. Accordingly, it is possible to encourage the flow of the atmospheric air and the fuel vapor to be more uniform, in the second chamber 30 as a whole.

(6) The coupler 72 in the second embodiment is arranged at the ends of the rod-shaped portions 70. Accordingly, in a case, for example, where the grid member 7 is formed as an integrated member by injection molding or other method, manufacture of the grid member 7 is facilitated.

In the process of manufacturing the canister 1, it is possible to arrange the grid member 7 in the second chamber 30 via the opening of the container 10 such that the coupler 72 is positioned on the port side, and subsequently, to arrange the adsorbent 61 in the second chamber 30 via the opening. Accordingly, workload in arranging the adsorbent 61 in the second chamber 30 can be reduced.

(7) The grid members 5 and 7 may each be configured respectively with the rod-shaped portions 50 and 70 of two or more types differing in the shape of the cross section, and also may comprise at least one particular rod-shaped portion. Accordingly, the ventilation resistance of the object chamber can be adjusted more flexibly.

7. Other Embodiments (1) In the above-described embodiments, the grid members 5 and 7 may be arranged, respectively, such that the rod-shaped portions 50 and 70 extend in a direction different from the gas flow direction (e.g., in a direction substantially perpendicular to the gas flow direction). Alternatively, the rod-shaped portions 50 of the grid member 5 and the rod-shaped portions 70 of the grid member 7 may each have a bent shape, may have different lengths, and may extend in different directions.

(2) The recesses 51 and 71 respectively formed on the rod-shaped portions 50 and 70 may be formed as groove-shaped portions extending in a direction different from the extending direction of the rod-shaped portions 50 and 70, respectively. Specifically, the recesses 51 and 71 may extend, for example, in a circumferential direction of the cross section of the rod-shaped portions 50 and 70, respectively, or may extend in a spiral manner. Alternatively, the recesses 51 and 71 are not limited to the groove-shaped portions and, for example, may be formed on dot-shaped areas on the outer peripheral surfaces of the rod-shaped portions 50 and 70, respectively.

(3) Two or more functions of a single element in the above-described embodiments may be performed by two or more elements, and a single function of a single element may be performed by two or more elements. Two or more functions performed by two or more elements may be performed by a single element, and a single function performed by two or more elements may be performed by a single element. Part of the configuration in the above-described embodiments may be omitted. At least a part of the configuration in the above-described embodiments may be added to or replace another configuration in the above-described embodiments.

What is claimed is:
1. A canister configured to be mounted in a vehicle with an engine, the canister comprising:
    at least one chamber in which an adsorbent to adsorb fuel vapor is arranged;

an inflow port configured to allow the fuel vapor to flow into the at least one chamber from a fuel tank of the vehicle;

an atmosphere port configured to allow atmospheric air to flow into the at least one chamber from outside of the vehicle;

an outflow port configured to allow the fuel vapor adsorbed on the adsorbent to flow out toward the engine by means of the atmospheric air flowing in from the atmosphere port; and a plurality of rod-shaped portions each having an elongated shape, the plurality of rod-shaped portions being arranged in an object chamber, the object chamber being any of the at least one chamber, the adsorbent arranged in the object chamber being formed as a plurality of granular bodies, at least a part of the plurality of rod-shaped portions having, on an outer peripheral surface thereof, at least one recess formed, the plurality of rod-shaped portions extending substantially parallel to a gas flow direction in the object chamber, the at least one recess being a groove-shaped portion extending substantially parallel to an extending direction of each rod-shaped portion of the plurality of rod-shaped portions on which the at least one recess is arranged, each granular body of the plurality of granular bodies as the adsorbent arranged in the object chamber being substantially cylindrically shaped, and a width of the at least one recess being smaller than a diameter of a cross section of each granular body of the plurality of granular bodies perpendicular to an extending direction thereof.

2. The canister according to claim 1, further comprising a coupler to couple each rod-shaped portion of the plurality of rod-shaped portions to another rod-shaped portion of the plurality of rod-shaped portions, wherein the coupler is arranged at an end of each rod-shaped portion of the plurality of rod-shaped portions.

3. The canister according to claim 1, further comprising a coupler to couple each rod-shaped portion of the plurality of rod-shaped portions to another rod-shaped portion of the plurality of rod-shaped portions, wherein the coupler is arranged at a position apart from ends of each rod-shaped portion of the plurality of rod-shaped portions.

4. The canister according to claim 1, wherein the plurality of rod-shaped portions comprises at least one particular rod-shaped portion, wherein the at least one particular rod-shaped portion has the at least one recess arranged thereon, and comprises at least two segments arranged along an extending direction of the at least one particular rod-shaped portion, and wherein the at least two segments adjacent to each other differ in a shape of a cross section thereof perpendicular to the extending direction of the at least one particular rod-shaped portion.

5. The canister according to claim 1, wherein the plurality of rod-shaped portions comprises rod-shaped portions of at least two types, and wherein the rod-shaped portions of at least two types differ in a shape of a cross section thereof perpendicular to an extending direction of each rod-shaped portion.

6. The canister according to claim 1, wherein at least a part of the plurality of rod-shaped portions has, on an outer peripheral surface thereof, a plurality of recesses formed.

7. The canister according to claim 1, wherein the at least one recess is formed on each rod-shaped portion of the plurality of rod-shaped portions.

8. A canister configured to be mounted in a vehicle with an engine, the canister comprising:

at least one chamber in which an adsorbent to adsorb fuel vapor is arranged;

an inflow port configured to allow the fuel vapor to flow into the at least one chamber from a fuel tank of the vehicle;

an atmosphere port configured to allow atmospheric air to flow into the at least one chamber from outside of the vehicle;

an outflow port configured to allow the fuel vapor adsorbed on the adsorbent to flow out toward the engine by means of the atmospheric air flowing in from the atmosphere port; and a plurality of rod-shaped portions each having an elongated shape, the plurality of rod- shaped portions being arranged in an object chamber, the object chamber being any of the at least one chamber, the adsorbent arranged in the object chamber being formed as a plurality of granular bodies, at least a part of the plurality of rod-shaped portions having, on an outer peripheral surface thereof, at least one recess formed, the plurality of rod-shaped portions extending substantially parallel to a gas flow direction in the object chamber, the plurality of rod-shaped portions comprising at least one particular rod-shaped portion, the at least one particular rod-shaped portion having the at least one recess arranged thereon, and comprising at least two segments arranged along an extending direction of the at least one particular rod-shaped portion, and the at least two segments adjacent to each other differing in a shape of a cross section thereof perpendicular to the extending direction of the at least one particular rod-shaped portion.

9. The canister according to claim 8, wherein the at least one recess is a groove-shaped portion extending substantially parallel to an extending direction of each rod-shaped portion of the plurality of rod-shaped portions on which the at least one recess is arranged.

10. The canister according to claim 8, further comprising a coupler to couple each rod-shaped portion of the plurality of rod-shaped portions to another rod-shaped portion of the plurality of rod-shaped portions, wherein the coupler is arranged at an end of each rod-shaped portion of the plurality of rod-shaped portions.

11. The canister according to claim 8, further comprising a coupler to couple each rod-shaped portion of the plurality of rod-shaped portions to another rod-shaped portion of the plurality of rod-shaped portions, wherein the coupler is arranged at a position apart from ends of each rod-shaped portion of the plurality of rod-shaped portions.

12. The canister according to claim 8, wherein the plurality of rod-shaped portions comprises rod-shaped portions of at least two types, and wherein the rod-shaped portions of at least two types differ in a shape of a cross section thereof perpendicular to an extending direction of each rod-shaped portion.

13. The canister according to claim 8,
wherein at least a part of the plurality of rod-shaped portions has, on an outer peripheral surface thereof, a plurality of recesses formed.

14. The canister according to claim 8,
wherein the at least one recess is formed on each rod-shaped portion of the plurality of rod-shaped portions.

\* \* \* \* \*